(12) United States Patent
Spielvogel

(10) Patent No.: US 8,500,129 B2
(45) Date of Patent: Aug. 6, 2013

(54) SLIDE RING SEAL ARRANGEMENT FOR HIGH CIRCUMFERENTIAL VELOCITIES

(75) Inventor: Artur Spielvogel, Dirmstein (DE)

(73) Assignee: KSB Aktiengesellschaft, Frankenthal (DE)

( * ) Notice: Subject to any disclaimer, the term of this patent is extended or adjusted under 35 U.S.C. 154(b) by 0 days.

(21) Appl. No.: 13/473,263

(22) Filed: May 16, 2012

(65) Prior Publication Data

US 2012/0242046 A1    Sep. 27, 2012

Related U.S. Application Data

(63) Continuation of application No. PCT/EP2010/067551, filed on Nov. 16, 2010.

(30) Foreign Application Priority Data

Nov. 17, 2009    (DE) .......................... 10 2009 053 360

(51) Int. Cl.
*F16J 15/34* (2006.01)

(52) U.S. Cl.
USPC .......................................................... 277/408

(58) Field of Classification Search
USPC ................................. 277/345–348, 358, 408
See application file for complete search history.

(56) References Cited

U.S. PATENT DOCUMENTS

| | | | | |
|---|---|---|---|---|
| 3,843,140 A | * | 10/1974 | Mayer et al. | 277/408 |
| 5,246,087 A | * | 9/1993 | Schipper | 184/5 |
| 6,129,246 A | * | 10/2000 | Metzler | 222/368 |
| 6,471,214 B1 | * | 10/2002 | Tornare et al. | 277/399 |
| 7,938,404 B2 | * | 5/2011 | Hagen et al. | 277/369 |
| 2009/0026710 A1 | * | 1/2009 | Hagen et al. | 277/368 |

FOREIGN PATENT DOCUMENTS

| | | |
|---|---|---|
| DE | 22 33 381 A1 | 1/1974 |
| DE | 74 07 251 U | 10/1974 |
| DE | 26 14 884 A1 | 1/1977 |
| DE | 199 46 219 A1 | 3/2001 |
| EP | 0 845 622 A2 | 6/1998 |
| WO | WO 98/54469 | 12/1998 |

OTHER PUBLICATIONS

English translation of International Preliminary Report on Patentability (seven (7) pages).
Corresponding International Search Report with English Translation dated Mar. 9, 2010 (seven (7) pages).

(Continued)

*Primary Examiner* — Thomas Beach
*Assistant Examiner* — Gilbert Lee
(74) *Attorney, Agent, or Firm* — Crowell & Moring LLP

(57) ABSTRACT

A slide ring seal for high circumferential velocities for sealing liquids with little or no electrical conductivity, such as low-salt feed water for feed water pumps including a pair of slide rings, one of which is rotationally fixed and the other of which rotates with a rotating component. The slide rings have interacting sliding surfaces which form a region loaded with the liquid to be sealed relative to a sealing gap. One ring is formed of material with satisfactory electrical conductivity and the other of low conductivity material. The seal is arranged in a dead-end circuit of a rotating component to be sealed and is connected to a cooling system. A metering device is provided in the circuit for introducing a substance as a function of a slide ring seal leak to maintain the electrical conductivity of the liquid between 3 and 500 µS/cm.

19 Claims, 5 Drawing Sheets

(56) References Cited

OTHER PUBLICATIONS

Form PCT/ISA/237 (seven (7) pages).

Burgmann Industries GmbH & Co., KG, www.burgmann.com, 2003, (five (5) pages).
German Office Action dated Dec. 20, 2010 (six (6) pages).

* cited by examiner

SLIDE RING SEAL ARRANGEMENT FOR HIGH CIRCUMFERENTIAL VELOCITIES

CROSS REFERENCE TO RELATED APPLICATIONS

This application is a continuation of international patent application no. PCT/EP2010/067551, filed Nov. 16, 2010, designating the United States of America and published in German on May 26, 2011 as WO 2011/061175, the entire disclosure of which is incorporated herein by reference. Priority is claimed based on Federal Republic of Germany patent application no. DE 10 2009 053 360.5, filed Nov. 17, 2009, the entire disclosure of which is likewise incorporated herein by reference.

BACKGROUND OF THE INVENTION

The invention relates to a slide ring seal arrangement for high circumferential velocities for the sealing of liquid fluids with low to no electrical conductivity, such as low-salt boiler feed water in the case of boiler feed-water pumps or the like, having at least one pair of slide rings, of which one can be installed in a rotationally immovable manner and the other installed for common rotation with a rotating component, which slide rings have interacting slide faces which during operation form between them a sealing gap which seals a region of the slide ring seal arrangement which is pressurized by the fluid to be sealed in relation to a surrounding region, wherein one of the slide rings is formed basically from a material with good electrical conductivity and the other slide ring is formed basically from a material with low electrical conductivity, wherein the slide ring seal arrangement is located in a dead-end circulation circuit of a rotating component which is to be sealed and is connected to a cooling system which has a filter.

The primary field of application of the invention concerns boiler feed-water pumps, wherein a boiler feed water which is to be delivered frequently has temperatures of up to 200° C. and is generally in the fully desalinated state. In order to protect the slide ring seals, which are used in such boiler feed-water pumps, against overheating, such sealing systems are provided with a cooling system. Such a slide ring seal system is disclosed in the Burgmann design manual 15.3, slide ring seals, edition of Oct. 13, 2005 on page 129 in the left-hand column 1. The slide ring seal, in accordance with API 682 or ISO 21049, is constructed with a circulation system as a so-called dead-end according to plan 23, cf. also page 97 of the design manual. This circulation system—for a pump shaft which is to be sealed—provides a slide ring seal arrangement which is connected to a separate heat exchanger. For protection of the slide ring seal, two magnetic filters are arranged in a dissipating cooling line in a 2-stranded section, by means of which metallic impurities in the circulation circuit of the slide ring seal are trapped. This sealing system is decoupled from the actual feed-water circuit of the pump, which is why the term dead-end has become established for it. In the circulation circuit, the heat exchanger is connected in a simple manner to an external cooling system so that the slide ring seal has a separate closed lubrication and cooling circuit. In this way, the maintaining of an operating temperature of below 100° C. is made possible for the slide ring seal.

Such slide ring seals are exposed to a delivery medium which has a very low electrical conductivity, being <1 µS/cm. In addition, the slide ring seals are subjected to very high circumferential velocities, frequently above 40 m/sec, as a result of which damage to the slide ring seals occurs after relative short operating times in the event of unfavorable operating parameters.

In such slide ring seal arrangements, which are known, for example, from EP 845,622, having a material combination of silicon carbide and carbon for their slide ring pairing, damage frequently occurs in the region of the silicon carbide ring as a result of the boiler feed water, which is in a desalinated prepared state and also used in the circulation circuit, on account of the high circumferential velocities. For avoiding said damage, it is proposed to discharge the electric charge caused by the high circumferential velocity on the poorly conducting silicon carbide ring from the circumferential region of the rotating slide ring to the surroundings, especially to the pump housing. For this purpose, the stationary slide ring, which is located in the housing, is provided with a conductive coating in order to therefore avoid the forming of a potential in the region of the slide ring seal.

DE 199 46 219 A1 shows a comparable method, in which for improving the service life it is proposed to pick off an electrical potential, which builds up on the slide ring seal during operation, from the shaft of the pump and to discharge it to an earthing point. This is to be carried out by a slip ring system, in which the electrical potential is picked off directly from the rings of the slide ring seal. Such a solution may perhaps function in specific individual cases, but it is contingent upon a direct mechanical engagement in the region of the slide ring seal, as a result of which further malfunctions and leakages can occur.

Furthermore, DE 199 46 219 A1, as prior art, mentions in its descriptive introduction the use of costly dosing devices on the slide ring seals, which introduce alkalizing or oxygen-binding chemicals in the region of the slide ring seal. Such dosing devices are separate from the water and steam cycle of a power plant unit and act only upon the separate circulation circuit of the slide ring seal arranged in the dead-end. These dosing devices, which are constructed as an additional dosing station, provide an alkaline mode of operation for the slide ring seal. The dosing devices have chemical tanks, a plurality of dosing pumps with overflow valves, additional dosing strands with magnetic valves and isolating valves arranged therein, and a plurality of conductivity controllers and a multiplicity of measuring probes for installing in the circuit. Deviations from the permissible operating state are signaled by an alarm. This dosing device feeds ammonia, and on occasion also a binding agent for oxygen in addition, into the circulation circuit. In addition to the complex piping arrangement, this also requires a permanent, complex chemical control of the water state or fluid state in the dead-end. Such dosing devices or dosing stations are associated with high plant-engineering and financial outlays, require a significant monitoring cost and include the risk of malfunction susceptibility.

SUMMARY OF THE INVENTION

The object of the invention is to provide slide ring seals with improved service life when exposed to fully desalinated fluids and operated at high circumferential velocity.

Another object of the invention is to provide a slide ring seal which can be operated in a cost-efficient manner with regard to plant engineering or by modifications to the slide ring seal to this end.

An additional object of the invention is to provide a slide ring seal which makes it possible to subsequently upgrade already installed slide ring seals.

These and other objects of the invention have been achieved by providing a dosing device, which increases the electrical conductivity of the fluid, arranged in the circulation circuit or connected thereto, in which the electrical conductivity is set to a value of 3-500 μS/cm. According to the invention, it has been recognized that with this, in an extremely simple way, selective corrosion on the non-conducting or very poorly conducting SiC or silicon carbide ring of the slide ring seal is avoided in an exceptionally reliable manner. It has been recognized that with the circumferential velocity, being equal to or greater than 45 m/sec, which is achievable in such a slide ring seal in the sealing region and during an operation with electrical conductivity of the fluid—increased exclusively in the circulation circuit—at the proposed value range from 3 to 500 μS/cm, selective corrosion on the slide ring seal is reliably avoided. The lower value of this electrical conductivity of 3 μS/cm lies many times below that of the customary conductive properties of tap water. The upper value of 500 μS/cm corresponds simply to the value of common tap water. Consequently, no threat to a slide ring seal is occasioned as a result.

In one experimental arrangement, an increase of the electrical conductivity only in the circulation circuit of a feed pump to a range from 3 μS/cm to 250 μS/cm has proved to be successful. In the case of these slide ring seals, an increase of their operating life of more than 25,000 operating hours is possible by such a conductivity increase.

Through further trials it was established that setting the electrical conductivity to the lower range from 3 μS/cm to 50 μS/cm is adequate and at the same time, a significant reduction of the dosing medium is made possible. The results of trials being run at the time of application reveal no reduction of the operating life. Such a reduction in the consumption of dosing medium is advantageously possible as a result of its addition or feed in portions into the circulation circuit. This can be carried out in liquid to solid form, for example by an autolytic granulate, partial quantities portioned in a tablet-like manner, crystalline portions, paste quantities, and/or combinations thereof. The addition of the dosing medium can be controlled by a magnetic valve. This is achieved by a temporary, delivery in portions from a reservoir or by a temporary connection of the reservoir to the circulation circuit in the latter. In this case, an osmotic pressure would also enable the dosing.

A conversion of already existing sealing circuits can be carried out when required in an extremely simple manner or prospective application cases can be enhanced by a simple component change for such purposes which considerably increase the operating life. The reservoir is advantageously constructed as an exchangeable cartridge. Such a design enables dosing medium to be introduced with the exclusion of air and therefore reduces the influences of atmospheric oxygen upon the circulation circuit and upon its electrical conductivity.

The dosing device can be a single-piece or multi-piece salt reservoir which is arranged in an extremely simple manner in a holder of a component which is located in the circulation circuit. This can also be of an exchangeable construction. In one embodiment the holder is formed as a cover section with integrated or connected reservoir with at least one discharge opening connecting the reservoir to the circulation circuit. Thus, a cover of a filter could be equipped with a salt reservoir, as a result of which a concentrating, and therefore an increase, of the electrical conductivity within the circulation circuit in the region of the slide ring seal is effected as a result of the internal circulation. The amount of concentration required in each case can easily be determined in a simple manner based on the known fluid volume circulating in the circulation circuit. As a result of the also known leakage volumes of such seals, it can be readily established how much of the conductivity-increasing medium has to be replenished in order to maintain a previously set conductivity value. In such a slide ring seal arrangement, an occurring leakage volume is replaced by a postflow from the feed circuit of the pump.

For this purpose, a further embodiment provides that an osmotic membrane controls the discharge volume through the discharge opening. On account of its small discharge volume, a previously set conductivity can therefore be maintained in the circulation circuit at desired values over a very long operating period.

In another embodiment a conductivity-measuring device is provided, as a result of which the electrical conductivity outside the slide ring seal—measured continuously or periodically on the leakage flow of the slide ring seal arrangement—is determined. Such conductivity measuring is also possible inside the slide ring seal or in the circulation circuit. The operating expenditure in each case lies at the discretion of an operator of such a plant, who has selected the measuring point in an existing plant.

In the case of a conductivity of 3 μS/cm or in the case of a lowering of the conductivity below a minimum value in the range from 3 μS/cm to 50 μS/cm, a simple replacement of the salt reservoir, acting as dosing device, or a renewed metered apportioning of a dosing medium portion in order to achieve the desired operationally reliable state, is sufficient. This can be carried out by the conductivity-measuring device on the basis of the indications or on the basis of an alarm. In the same way, the conductivity-measuring device can directly or indirectly control the addition of the dosing medium. In order to protect the slide ring seal arrangement, additional filters, for example magnetic filters, may be arranged within the circulation circuit of such a slide ring seal arrangement. These additional filters can be separated from the circulation circuit by isolating valves for maintenance purposes. In these standard filters, the arrangement of an insert for a dosing medium may be offered. In the same way, a filter, cooler or similarly easily accessible component can be used as a dosing device. Therefore, during routine operation a problem-free exchange or renewal of the conductivity-improving device is possible. In the same way, a feed point and/or reservoir for the dosing medium and/or interfaces for conductivity measuring can be provided on other components located in the circulation circuit by a simple exchange of parts or by attaching an additional part. A conductivity-measuring device continuously or periodically determines and controls the electrical conductivity which was set for the reliable operation of the respective slide ring seal in a plant.

During routine operation of the pump and of the slide ring seal arrangement located in the dead-end, a state of equilibrium exists in the circuits due to which no exchange of feed water is carried out between them. If during operation customary leakages occur in the cooling circuit or circulation circuit, then such a leakage volume is made up or replenished with a similar volume of postflowing feed water of extremely low electrical conductivity from the pump chamber. As a result of the fluid circulating in the circulation circuit from the dead-end and its associated dosing medium, the lower electrical conductivity of the postflowing fluid or feed water is increased to the required value of at least 3 μS/cm. In this way, the service life of such a slide ring seal, which is highly loaded as a result of the high circumferential velocities, is extended by many times and therefore the operating reliability and availability of power plants which are equipped with such seals are decidedly improved.

To this end, another solution provides that a dosing device in the form of a dosing-medium feed device is connected to the circulation circuit, the feed volume of which sets the electrical conductivity of the fluid to a value in the range from 3 to 500 μS/cm as a function of a slide ring seal leakage. In accordance with further developments of this arrangement, the electrical conductivity is also set to a range from 3 μS/cm to 250 μS/cm or to a range of from 3 μS/cm to 50 μS/cm. This is dependent upon the respective circumstances of a slide ring seal and its circulation circuit. Such a dosing-medium feed system can be a buffer accumulator or a simple piston pump. Its feed lines are connected to a valve, to a filter element or to another point of the circuit. Such a system also compensates for possible leakage losses, and in so doing simultaneously maintains the conductivity of the circulation circuit at a set value.

The dead-end structural construction prevents a reverse flow from the circulation circuit back into the feed pump. Therefore, in an extremely simple way and without costly plant-engineering installations and monitoring devices for high-speed slide ring seals with circumferential velocities of more than 40 m/sec, selective corrosion on the silicon carbide ring is reliably prevented as a result of the targeted retention of the electrical conductivity at a value which is equal to or greater than 3 μS/cm. This solution greatly increases the operating life of a slide ring seal.

In the same way, using a further embodiment, the conductivity-measuring device can trigger an alarm if a predetermined measured value or a plurality of measured values is/are exceeded.

BRIEF DESCRIPTION OF THE DRAWINGS

The invention will be described in further detail hereinafter with reference to illustrative preferred embodiments shown in the accompanying drawing figures, in which.

DETAILED DESCRIPTION

Figure 1:
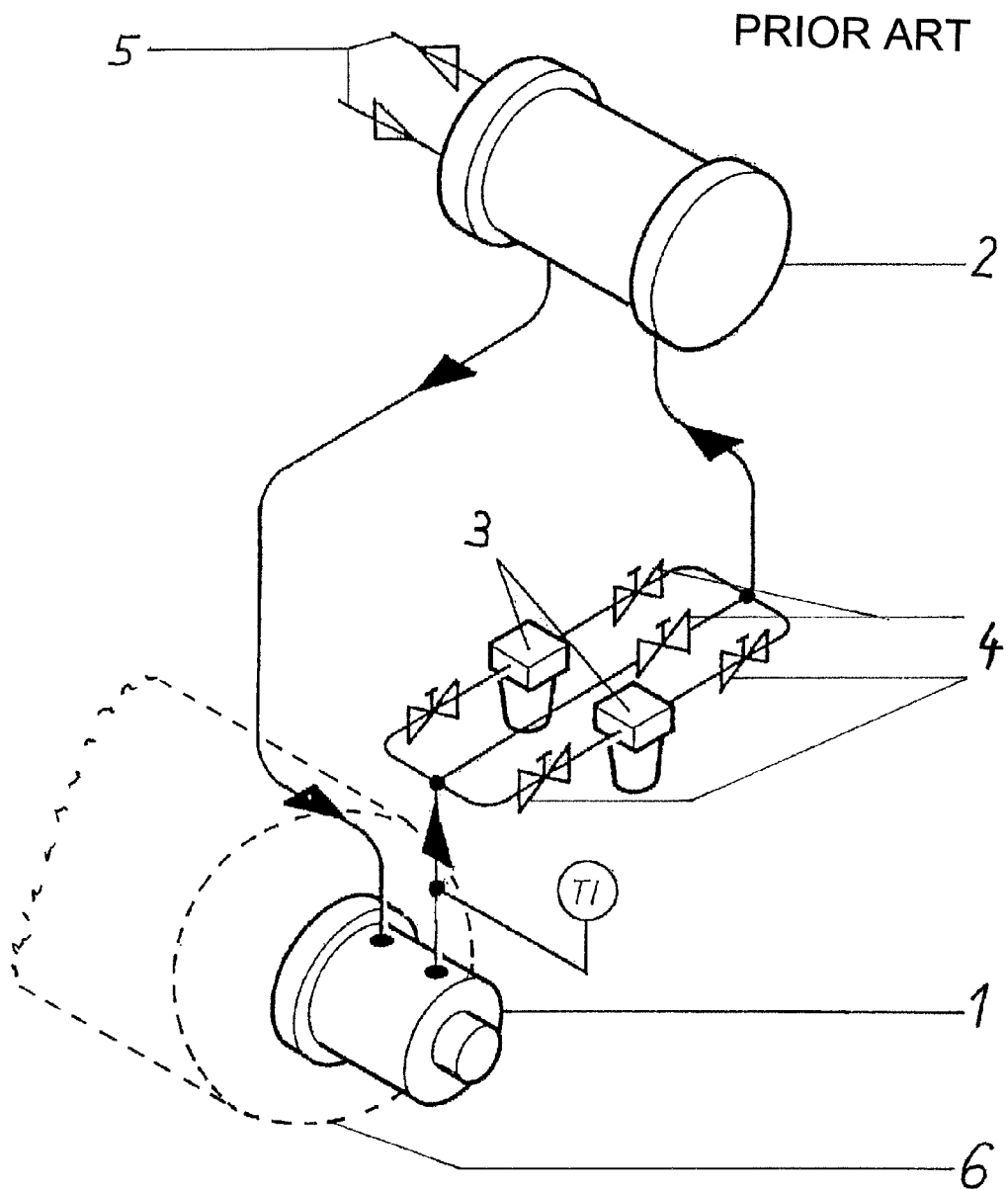
FIG. 1 depicts a prior art sealing system with cooling according to the Burgmann design manual.

FIG. 1 shows a prior art slide ring seal arrangement with cooling, as is known through the Burgmann design manual 15.3, slide ring seals. Lines which are identified by the arrows which indicate the throughflow direction represent a circulation circuit between a seal housing 1 and a heat exchanger 2. A throughflowing sealing fluid in this case flows through two parallel-disposed filters 3 and 3', which trap any solids which may be present so that only cleaned sealing fluid is directed to the heat exchanger 2, from which it flows back in the cooler state to the seal housing 1. The filters 3 can be connected to, or disconnected from, the circulation circuit through isolating valves 4. The heat exchanger 2 can be connected in an extremely simple manner to a simple cooling water system 5 which is located in a power plant. Costly monitoring devices are not necessary for this purpose. As a result of this simple cooling possibility for the proportion of feed water which serves as sealing fluid, and because no backflow can occur into the pump 6, which is represented only schematically and by dashed lines, such a sealing system is known by the term "dead-end".

Figure 2:
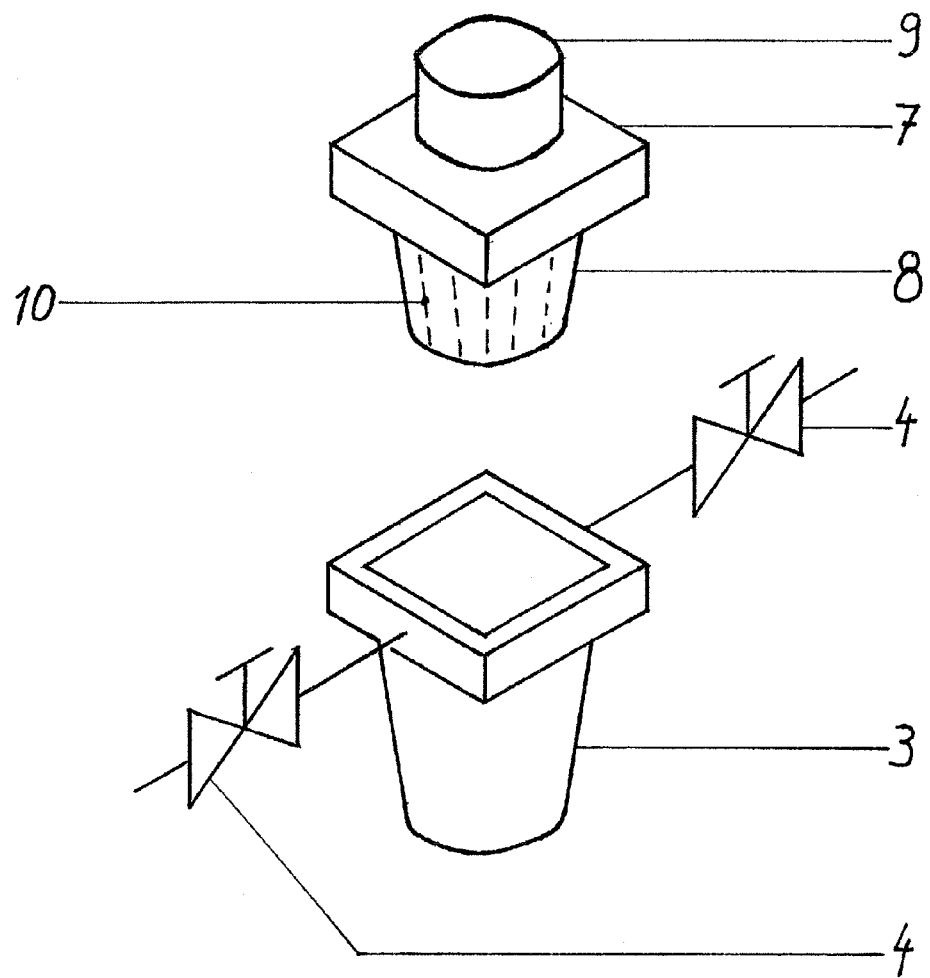
FIGS. 2 and 3 show dosing device for a slide ring seal arrangement in the dead-end.

FIG. 2 shows a solution according to the invention. To this end, reservoirs 8, 9 are arranged in a component of the circulation circuit, in this case arranged in the cover 7 of the filter 3, for example, in which is located a medium, frequently a salt, which increases the electrical conductivity of the sealing fluid. The reservoir 8 can be formed as an internal insert and the reservoir 9 can be formed as an external attachment. This is dependent upon the type of construction of the component. At least one discharge opening 10 connects the reservoir 8, 9 to the circulation circuit. Such a reservoir can be connected as an additional element to the cover section, for example by a threaded connection or a plug-in connection. In the same way, an existing cover can be replaced by another cover with integrated reservoir. Due to the permanent circulation of the sealing fluid inside the filter or inside one of the other components 1, 2, 3, 4 of the circulation circuit, the electrical conductivity is set by the dosing device to a value from 3 to 500 μS/cm and therefore avoids selective corrosion resulting from a voltage potential in the region of the slide ring seal which is located inside the seal housing 1 and therefore not shown.

Figure 3:
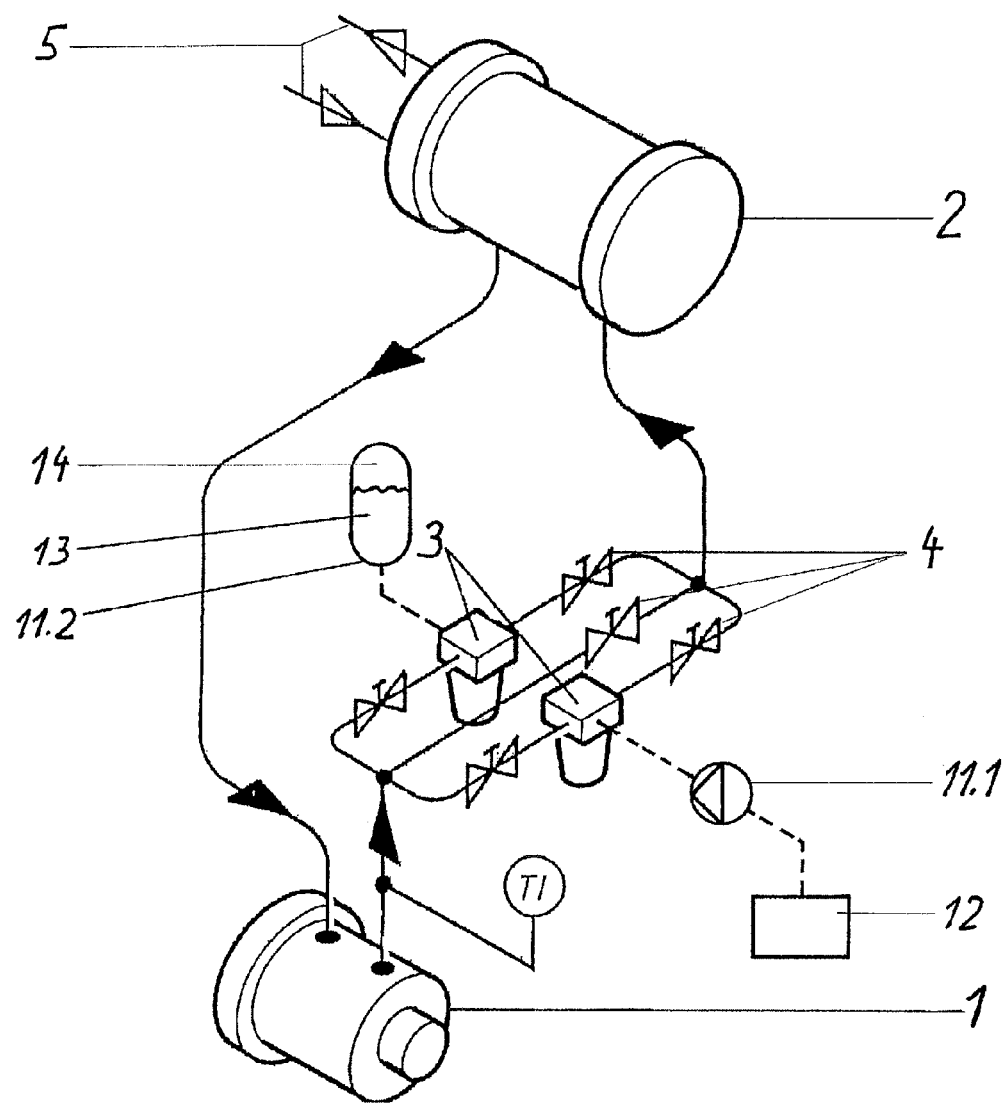

FIG. 3 shows a dosing-medium feed device which can be connected to different points of the circulation circuit. The different connecting possibilities are shown by broken lines. The temperature in the circulation circuit is monitored by a temperature-measuring device TI. The dosing-medium feed device 11.1 in this case is constructed as a pump 11.1, for example as a simple piston pump for fluid or solid dosing medium, which is delivered from a reservoir 12 which in this case is arranged externally. In the same way, a buffer accumulator can form a dosing-medium feed device 11.2. The buffer accumulator uses a reservoir 13 which under the influence of a pressure cushion 14 ensures the feed of dosing medium.

The embodiment of FIG. 3 shows an alternative solution, in which a dosing-medium feed device acts upon the circulation circuit through a simple connecting piece. Its feed capacity lies within the order of magnitude of a possible seal leakage equal to, or less than, 1 liter per hour. In this case, it can be a pressure accumulator or a simple dosing pump, the delivery volume of which is set to the seal leakage. Therefore, it is sufficient if this dosing-medium feed device, with the established conductivity, replenishes only a leakage volume and by which the conductivity level of the cooling fluid is ensured. A conductivity-measuring device 15 from FIG. 4 can also control this.

Figure 4:
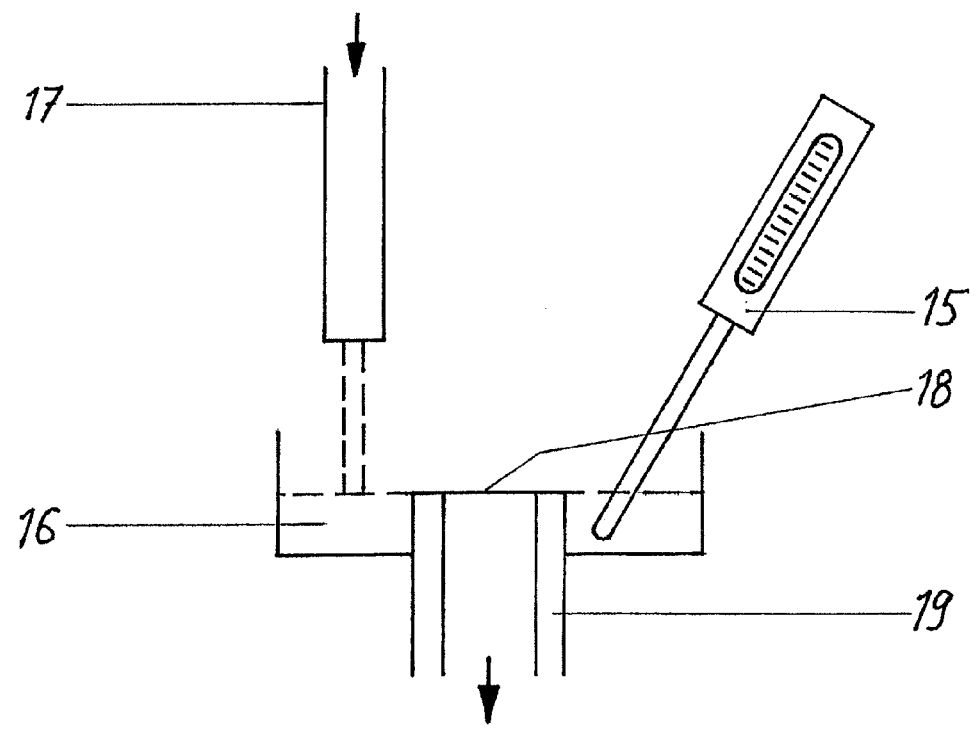
FIG. 4 shows a conductivity measuring device.

FIG. 4 schematically shows a conductivity-measuring device 15 which is in functional communication with a leakage collecting chamber 16 of the slide ring seal arrangement. The leakage collection chamber 16 can be arranged inside or outside the seal housing 1. From a sealing gap of the slide ring seal, which is not shown here, a minimum leakage flows via a line 17 into the leakage-collecting chamber 16. The conductivity can be measured within this. In this example, the height of an inlet opening 18 of a drain line 19 determines the height of the fluid level of the leakage volume.

The conductivity of the sealing fluid at the seal housing 1 is controlled in an extremely simple manner through a conductivity measurement in the region of a leakage-collecting chamber of a slide ring seal. A lowering of the conductivity indicates a consumption of the dosing medium. Therefore, during routine operation, for example by closing isolating valves 4 upstream and downstream of one of the filters 3, as is shown in FIG. 2, this can be provided with a new portion of dosing medium in order to then admit this filter into the circuit again. In the same way, it is possible to keep a preconfigured second filter, equipped with dosing medium, isolated from the circuit. During a replenishment of the dosing medium, the first filter with the emptied reservoir is isolated from the circulation circuit and instead the preconfigured second filter is connected into the circulation circuit.

Figure 5:
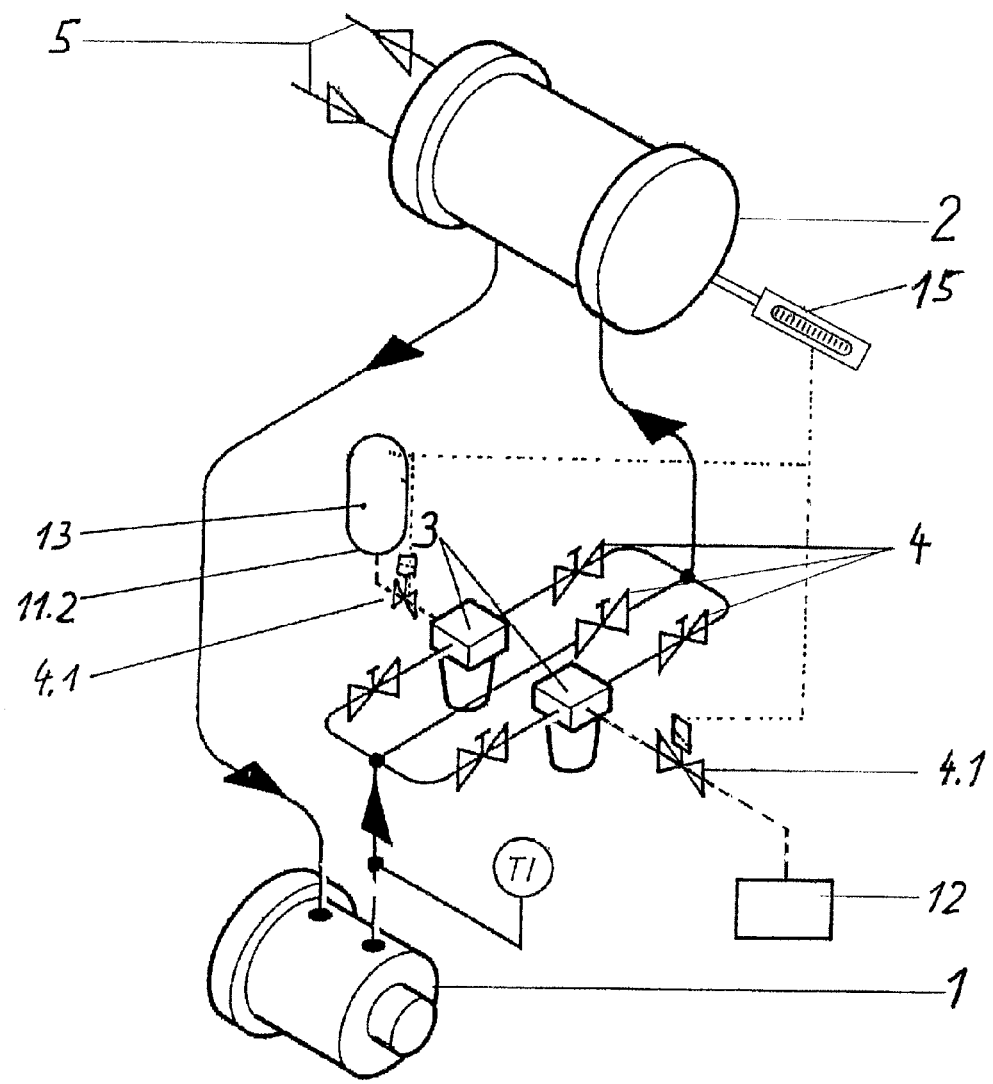
FIG. 5 shows dosing device similar to FIG. 3 with a magnetic valve and a conductivity measuring device.

FIG. 5 shows another dosing-medium feed device, similar to the representation of FIG. 3, which can be connected to different points of the circulation circuit. The different connecting possibilities are shown by broken lines. The temperature in the circulation circuit is monitored by a temperature-measuring device TI. The dosing-medium feed device of FIG. 3, which is a pump 11.1, is formed by a magnetic valve 4.1 in FIG. 5. In this way, the respectively required volume, portion or dose or the like of dosing medium is extracted from the storage vessel 12 which is designed for low pressure. Combinations of the structures shown in FIGS. 3 and 5 are also possible. A buffer accumulator, which forms the dosing-medium feed device 11.2, can also be constructed as an exchangeable cartridge. The conductivity-measuring device 15, which in this case is connected directly to the circulation circuit of the slide ring seal, registers emptying of the reservoir 13 of the buffer accumulator. In the illustrative embodiment shown, this connection is effected on the cooler 2, wherein other simple installation or connection points are also possible. Also, between the circulation circuit and the exchangeable cartridge as a dosing-medium feed device 11.2, a magnetic valve 4.1 can be arranged as a dosing device. Inside the cartridge, the dosing medium can be in any form which is suitable for a metered apportioning. The conductivity-measuring device 15 can control the addition of dosing medium in a direct or indirect manner. Its connection to the various dosing device is indicated by dotted connecting lines.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

The invention claimed is:

1. A slide ring seal arrangement for high circumferential velocities for sealing a liquid with low to no electrical conductivity, said seal arrangement comprising at least one pair of slide rings, one of which is installed in a rotationally immovable manner and the other of which is installed for common rotation with a rotating component; said slide rings having interacting slide faces which during operation form between them a sealing gap which seals a region of the slide ring seal arrangement which is pressurized by the fluid to be sealed in relation to a surrounding region, wherein
 one of the slide rings is formed substantially from a material with good electrical conductivity and the other slide ring is formed substantially from a material with low electrical conductivity;
 the slide ring seal arrangement is located in a dead-end circulation circuit of a rotating component which is to be sealed and is connected to a cooling system which has a filter;
 a dosing device, which increases the electrical conductivity of the fluid, is arranged in or connected to the circulation circuit; and
 the electrical conductivity of the fluid is set to a value in the range of from 3 to 500 μS/cm.

2. The slide ring seal arrangement as claimed in claim 1, wherein the electrical conductivity is set to a range from 3 μS/cm to 250 μS/cm.

3. The slide ring seal arrangement as claimed in claim 1, wherein the electrical conductivity is set to a range from 3 μS/cm to 50 μS/cm.

4. The slide ring seal arrangement as claimed in claim 1, wherein the dosing device comprises at least one reservoir for a conductivity-increasing substance which is arranged in a holder of a component which is located in the circulation circuit.

5. The slide ring seal arrangement as claimed in claim 4, wherein the conductivity-increasing substance is a salt.

6. The slide ring seal arrangement as claimed in claim 4, wherein the holder is constructed as a cover section with an integrated or connected salt reservoir with at least one discharge opening connecting the reservoir to the circulation circuit.

7. The slide ring seal arrangement as claimed in claim 6, further comprising an osmotic membrane for controlling the discharge volume through the discharge opening.

8. The slide ring seal arrangement as claimed in claim 1, wherein the dosing medium is admitted into the circulation circuit in portions.

9. The slide ring seal arrangement as claimed in claim 1, further comprising a magnetic valve arranged between the reservoir and the circulation circuit for controlling the addition of the dosing medium.

10. The slide ring seal arrangement as claimed in claim 1, wherein the reservoir is constructed as an exchangeable cartridge.

11. The slide ring seal arrangement as claimed in claim 1, further comprising a conductivity-measuring device for continuously or periodically determining and controlling the electrical conductivity of the liquid.

12. The slide ring seal arrangement as claimed in claim 11, wherein the electrical conductivity is determined by a conductivity-measuring device which detects the leakage flow inside or outside the slide ring seal arrangement.

13. The slide ring seal arrangement as claimed in claim 11, wherein the conductivity-measuring device triggers an alarm if the measured conductivity exceeds a predetermined limit value.

14. A slide ring seal arrangement for high circumferential velocities for sealing of a liquid having low to no electrical conductivity, comprising at least one pair of slide rings, one of which one is installed in a rotationally immovable manner and the other of which is installed for common rotation with a rotating component, said slide rings having interacting slide faces which during operation form between them a sealing gap which seals a region of the slide ring seal arrangement which is pressurized by the liquid to be sealed in relation to a surrounding region, wherein
 one of the slide rings is formed substantially from a material with good electrical conductivity and the other slide ring is formed substantially from a material with low electrical conductivity;
 the slide ring seal arrangement is located in a dead-end circulation circuit of a rotating component which is to be sealed and is connected to a cooling system having a filter;
 a dosing-medium feed device is connected to the circulation circuit, said dosing-medium feed device operating at a feed volume which sets the electrical conductivity of the fluid to a value in the range from 3 to 500 μS/cm as a function of a slide ring seal leakage.

15. The slide ring seal arrangement as claimed in claim 14, wherein the electrical conductivity is set to a range from 3 µS/cm to 250 µS/cm.

16. The slide ring seal arrangement as claimed in claim 15, wherein the electrical conductivity is set to a range from 3 µS/cm to 50 µS/cm.

17. The slide ring seal arrangement as claimed in claim 14, wherein the dosing-medium feed system comprises a buffer accumulator, a controlled valve or a pump.

18. The slide ring seal arrangement as claimed in claim 17, wherein the dosing-medium feed system comprises a magnetic valve.

19. The slide ring seal arrangement as claimed in claims 14, wherein the conductivity-measuring device triggers an alarm if the measured conductivity exceeds a predetermined limit value.

\* \* \* \* \*